United States Patent [19]
Miner et al.

[11] Patent Number: 6,021,181
[45] Date of Patent: Feb. 1, 2000

[54] ELECTRONIC VOICE MAIL MESSAGE HANDLING SYSTEM

[75] Inventors: Richard A. Miner, Cambridge; David M. Pelland, Boston; William J. Warner, Cambridge; Nancy Benovich Gilby, Concord, all of Mass.

[73] Assignee: Wildfire Communications, Inc., Lexington, Mass.

[21] Appl. No.: 08/804,548

[22] Filed: Feb. 24, 1997

[51] Int. Cl.[7] .................................................. H04M 3/50
[52] U.S. Cl. ................................ 379/88.23; 379/88.04; 379/88.02
[58] Field of Search .............................. 704/275; 379/67, 379/88, 89, 210, 211, 212, 201, 88.23, 67.1, 88.02, 88.01, 88.04, 88.24, 88.22

[56] References Cited

U.S. PATENT DOCUMENTS

| | | | |
|---|---|---|---|
| 4,313,035 | 1/1982 | Jordan et al. | 179/18 BE |
| 4,585,906 | 4/1986 | Matthews et al. | 179/18 BE |
| 4,761,807 | 8/1988 | Matthews et al. | 379/89 |
| 4,827,500 | 5/1989 | Binkerd et al. | 379/88 |
| 4,873,719 | 10/1989 | Reese . | |
| 4,933,966 | 6/1990 | Hird et al. | 379/132 |
| 4,953,204 | 8/1990 | Cuschleg, Jr. et al. | 379/266 |
| 4,972,462 | 11/1990 | Shibata | 379/89 |
| 5,131,024 | 7/1992 | Pugh et al. | 379/67 |
| 5,195,086 | 3/1993 | Baumgartner et al. | 370/62 |
| 5,243,645 | 9/1993 | Bissell et al. | 379/211 |
| 5,260,986 | 11/1993 | Pershan | 379/67 |
| 5,263,084 | 11/1993 | Chaput et al. . | |
| 5,329,578 | 7/1994 | Brennan et al. . | |
| 5,333,266 | 7/1994 | Boaz et al. . | |
| 5,355,403 | 10/1994 | Richardson, Jr. et al. . | |
| 5,357,596 | 10/1994 | Takebayashi et al. | 704/275 |
| 5,384,771 | 1/1995 | Isidoro et al. . | |
| 5,408,526 | 4/1995 | McFarland et al. | 379/202 |
| 5,414,754 | 5/1995 | Pugh et al. | 379/67 |
| 5,436,963 | 7/1995 | Fitzpatrick et al. . | |
| 5,506,890 | 4/1996 | Gupta et al. | 379/209 |
| 5,528,670 | 6/1996 | Elliot et al. | 379/89 |
| 5,655,006 | 8/1997 | Cox, Jr. et al. | 379/89 |
| 5,761,637 | 6/1998 | Chino | 704/275 |

OTHER PUBLICATIONS

Copy of International PCT Report dated Mar. 20, 1996, PCT/US95/11737.

"WordPerfect Office Telephone Access Server," *WordPerfect Office Techbrief*, 10:1–3 (1994).

"WordPerfect: New Telephony Features Boost Office", WordPerfect Office TechBrief, 1994 Info–World Publishing Company, vol. 10, Issue 2, p.2–3.

Schmandt et al., "Phone Slave: A Graphical Telecommunications Interface", Proceedings of the SID, vol. 26/1, 1985 pp. 79–82.

Schmandt et al., "A Conversational Telephone Messaging System", IEEE Transactions on Consumer Electronics, Aug. 1984, vol. CE–30, No. 3, pp.xxi–xxiv.

Schmandt, "Phoneshell: the Telephone as Computer Terminal" pp.373–382, Proceedings of ACM Multimedia '93 Conference, 1993.

"The Electronic Receptionist—A Knowledge–Based Approach to Personal Communications" Bellcore, pp. 1–8 (1994).

"The Electronic Receptionist —A Knowledge–Based Approach to Personal Communications" IEEE (1992).

Thich Vi Ly, "Chatter: A Conversational Telephone Agent" submitted to Program in Media Arts and Sciences, at the Massachusetts Institute of Technology, Jun. 1993, pp.1–130.

*Primary Examiner*—Daniel S. Hunter
*Attorney, Agent, or Firm*—Fish & Richardson P.C.

[57] ABSTRACT

A virtual intercom method implemented by a computer-based electronic assistant and including the steps of receiving a voice command from a first party, wherein the voice command identifies a user selectable one of a plurality of subscriber parties; responding to the voice command by generating a greeting to the first party, wherein the greeting is an audio recording in the voice of the identified subscriber; receiving a message generated by the first party for the identified subscriber; and storing the received message for later playback to the identified subscriber.

2 Claims, 6 Drawing Sheets

| | |
|---|---|
| Hello, I'm the assistant for the Warner Associates. Please say the name of the person you are trying to reach; "Bill Warner", "Jane", "Sally", "Pete", or anyone. | STEP 200 |
| Wildfire. | STEP 202 |
| Oh hi, "Bill". How is it going? | STEP 204 |
| Just fine. | STEP 206 |
| Okay, let's get started. You have new messages from "Joe", "Pam" and "Gregg". Also, "Bob Smith from Allied Industries" called. You have one reminder and there are 2 new notes on the fridge. | STEP 208 |
| The first message is from "Joe". | |
| What's it say? | STEP 210 |
| "...play message from Joe..." | STEP 212 |
| Hey Gregg. | STEP 214 |
| What's up, Bill? | STEP 216 |
| "...record message to Gregg..." | |
| Got it. I'll see that he gets it. | STEP 218 |
| • | |
| • | |
| • | |
| Next item. | STEP 220 |

FIG. 4A

| | |
|---|---|
| Message from "Bob Smith of Allied Industries".<br>"...play message from Bob Smith..." | |
| Previous item. | |
| Message from Joe. | |
| Tell me more. | STEP 222 |
| This message arrived yesterday at 11 am. It's a reply to a message from you. | STEP 224<br>STEP 226 |
| Tell me more. | |
| Here is the original message.<br>"...play the message..." | STEP 228 |
| Tell me more. | STEP 230 |
| That's all I know. | STEP 232 |
| Next item. | |
| Message from "Bob Smith of Allied Industries".<br>"...play message from Bob Smith..." | |
| Next item. | |
| Message from Pam.<br>"...play message from Pam..." | |
| Hey everyone. | STEP 240 |
| Hello, hello, hello... | STEP 242 |
| ...record message to everyone... | |

FIG. 4B

| | |
|---|---|
| Got it. Should I post it to the fridge? | STEP 244 |
| Yes. | |
| Okay. | STEP 246 |
| Next item. | |
| That was your last new message. Let's look on the fridge. The first item is a new posting from "Pam". <br> "...play message from Pam..." | STEP 250 |
| "Joe" added "...play Joe's addition..." | |
| "Gregg" added "...play Gregg's addition..." <br> -blip- | |
| Send a reply. | STEP 252 |
| Go ahead. | STEP 254 |
| "...record reply message..." | STEP 256 |
| Got it. Should I add it to this posting? | STEP 258 |
| Yes. | |
| Okay. | STEP 260 |
| Next item. | |
| New posting from "Joe". <br> "...play posting from Joe..." | |

FIG. 4C

ELECTRONIC VOICE MAIL MESSAGE HANDLING SYSTEM

BACKGROUND OF THE INVENTION

The invention relates generally to computer-implemented, voice messaging systems.

Today there are many different commercially available electronic devices which assist people in communicating which each other. In addition to the ubiquitous telephone that has been around for decades, there are also cordless phones for the home, mobile phones for the car, handheld wireless phones which fit into the user's pocket, pagers, local and wide area computer networks, and facsimile machines just to name a few. The number and variety of such devices continues to grow. Thus, there is also an growing need to find effective ways to coordinate and handle the electronic communications that such devices make possible.

One system which addresses this growing need is described in U.S. patent application Ser. No. 08/316,635, entitled, "A Network Based Knowledgeable Assistant", filed Sep. 30, 1994, now U.S. Pat. No. 5,652,789, and incorporated herein by reference. The system described therein is referred to as an electronic assistant. It is a computer-implemented entity that assists a user (referred to as a subscriber) with his or her communications by carrying out certain tasks that are delegated to it. This electronic assistant, modeled to have human-like qualities, recognizes speech and performs functions within the familiar model of an office.

Each subscriber who has an account is assigned at least one electronic assistant which may be dedicated or shared. The electronic assistant offers services to both the subscriber and to any contacts or other callers trying to reach the subscriber. A contact is a person, place, or group that the subscriber has described for the electronic assistant. A contact can be another subscriber or an outside caller. Electronic assistants treat both subscribers and contacts as users of the system.

The electronic assistant offers a wide range of services to its subscribers, among which are the following. The electronic assistant can handle incoming calls from several of the subscriber's personal contacts while at the same time it is doing any of its tasks, including reviewing messages with the subscriber, managing information, etc. It can make logical decisions about how to manage, whether to forward, and where to forward the incoming calls from the subscriber's contacts. The electronic assistant can also communicate with the subscriber and the subscriber's contacts using a wide variety of different communication devices, such as telephones, fax machines, pagers, computer terminals, and communications enabled handheld devices (e.g. Personal Digital Assistants otherwise referred to as PDA's). When the subscriber tries to reach a contact or a contact tries to reach the subscriber, the electronic assistant mediates the connection and then remains available to add value to the session. The electronic assistant can schedule and manage reminders for its subscriber. When reminders come due, the electronic assistant notifies the subscriber.

Though such systems represent a significant advance in the field and provide great convenience and benefit to the users, there is still substantial room for improvement. The invention described herein represents a further extension of the technology represented in part by the above-described electronic assistant.

SUMMARY OF THE INVENTION

The invention relates to a virtual intercom method implemented by a computer-based electronic system. The method features the steps of receiving a voice command from a first party, the voice command identifying a user selectable one of a plurality of subscriber parties, and responding to the voice command by generating a greeting to the first party wherein the greeting is an audio recording in the voice of the identified subscriber. The invention further features receiving a message generated by the first party for the identified subscriber and storing that received message for later playback to the identified subscriber.

In another aspect, the invention relates to a message handling method implemented by a computer-based electronic assistant. The method features the steps of receiving a voice command from a first party, the voice command identifying a group of recipients, and responding to the voice command by generating an audio greeting acknowledging the voice command. In this aspect, the method further features receiving a message generated by the first party for the identified group of recipients and storing the received message for later playback by each member of the group of recipients.

In yet another aspect, the message handling method features the steps of storing a general voice mail message intended for a plurality of recipients, receiving a call from a caller, the caller being one of the plurality of recipients, notifying the caller that the general voice mail message is available for the caller, and in response to receiving a first command from the caller playing the general voice mail message to the caller. The method further features steps of, in response to receiving a second command from the caller, recording a reply message from the caller, and appending the reply message to the general voice mail message to generate a modified message. The method then features the step of storing the modified message for later playback by any of the plurality of recipients.

In another aspect of the invention, the message handling method is implemented by a computer-based electronic assistant and features the steps of storing a voice message that includes a recorded message and stored information describing the voice message, and wherein the voice message is a reply to a first message; receiving a command of a first command type from a caller; in response to receiving the command of the first command type, playing the recorded message to the caller; and after playing the recorded contents, receiving a command of a second command type from the caller. The method further features the steps of reporting to the caller the stored information describing the voice message in response to receiving the command of the second command type; and after reporting the stored information, receiving a further command of the second type and then, in response thereto, playing the first message to which the voice message was a reply.

In yet another aspect, the invention relates to a call handling method implemented by a computer-based electronic assistant. The method features the steps of using the computer-based electronic assistant to monitor a telephone call between a first person and a second person; and in response to a first command issued by either the first or the second person, causing the electronic assistant to intervene and participate in the telephone call. In this aspect, the method further, in response to a further command issued by either person, features the step of causing electronic assistant to provide voice mail services to the party issuing the further command, thereby permitting the other party to terminate its participation in the telephone call.

Other advantages and features will become apparent from the following description of the preferred embodiment and from the claims.

BRIEF DESCRIPTION OF THE DRAWINGS

FIGS. 4a–4c is a dialog which illustrates the relevant functionality that is supported and implemented by the system shown in FIG. 1;

DESCRIPTION OF THE PREFERRED EMBODIMENTS

As background we refer the reader to related technology described in U.S. patent application Ser. No. 08/316,635, filed Sep. 30, 1994, and incorporated herein by reference. The functionality described below can be implemented using the technology and systems described in the above-referenced patent application or in other ways that would be readily known to person of ordinary skill in the art.

Overall Hardware Configuration

Figure 1:
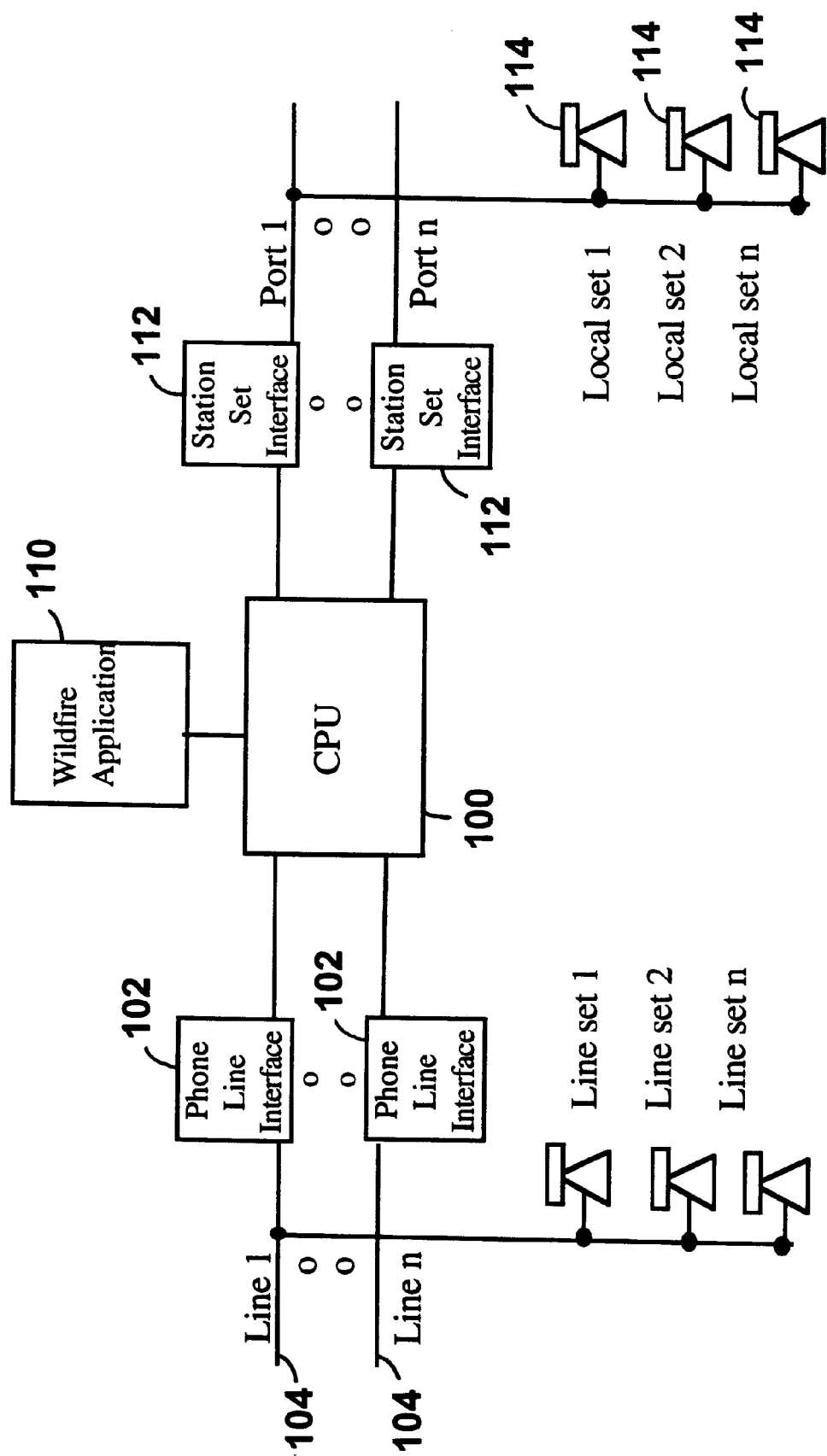
FIG. 1 is an overall block diagram of a system which embodies the invention.

FIG. 1 shows the block diagram of a system, including main system components and phone connections, which manages communications to and/or from a user over multiple media. The system consists of a personal computer CPU 100 (e.g. an Intel 486 or Intel Pentium™ processor) and associated therewith, either as a separate add-in board or as capabilities of the CPU board itself, phone line interfaces 102, which handle a number of phone lines 104 and provide for answering of incoming calls, placing of outgoing calls, signaling through touch tones, detection of voice or data signals on the lines, and transfer of these signals to CPU 100 for further processing by an application program 110 (i.e., a personal assistant), which is running on the computer and which includes a speech recognition capability. There are also station set interfaces 112 which contain one or more ports for station sets 114. A number of station sets 114 can be connected in parallel to any port. Station set interface 112 provides voice signals to station sets 114 and allows the application program 110 to determine when the phone is placed off or on hook.

There is commercially available hardware which can be used to implement the hardware components that are shown in FIG. 1. For example, one could use a simple cost-effective single-line system that is built around advanced voice, data, and fax modems (referred to in the industry as "AT+V Modems) provided by a range of vendors, such as for example a Rockwell xxx—xxx modem controller. These configurations provide for one incoming line, and provide the ability to drive one station set. However, a system that provides two incoming lines has significant advantages though it does add to the cost of the system. A two line system would be important for small businesses as well as for families with high phone traffic.

The described embodiment is a system with at least two independent phone line interfaces, as well as at least one, and preferably two, station set ports. If there are multiple ports, a switching capability will also be required that allows any station set port to be connected to any line, or just to the speech recognizer and application. Also, the described embodiment has the ability to generate a ring signal on any station set port, which will ring the phone.

Other configurations are envisioned where there are more incoming lines, and more station set ports. This, combined with the switching capability will allow the software application to create a small PBX for an office, thereby handling all phone tasks in a low cost computer.

Also envisioned are configurations where the hardware capability is external to the computer, and is connected to the computer via a high-speed data connection. This could be a parallel port, a serial port, or the recently announced Serial Bus architecture from Intel's Architecture labs as defined in Intel's document number xxx–xxxx. These external approaches let users add the hardware capabilities to their system without the need to open the box and install new hardware cards.

Further, we envision that the personal assistant could run from a telephony-enabled set-top box such as those being provided by the cable TV companies. In this case, speech recognition would be performed on the CPU in the set top box, and phone interfacing would be done through an interface in the box.

Software Configuration

Figure 2:
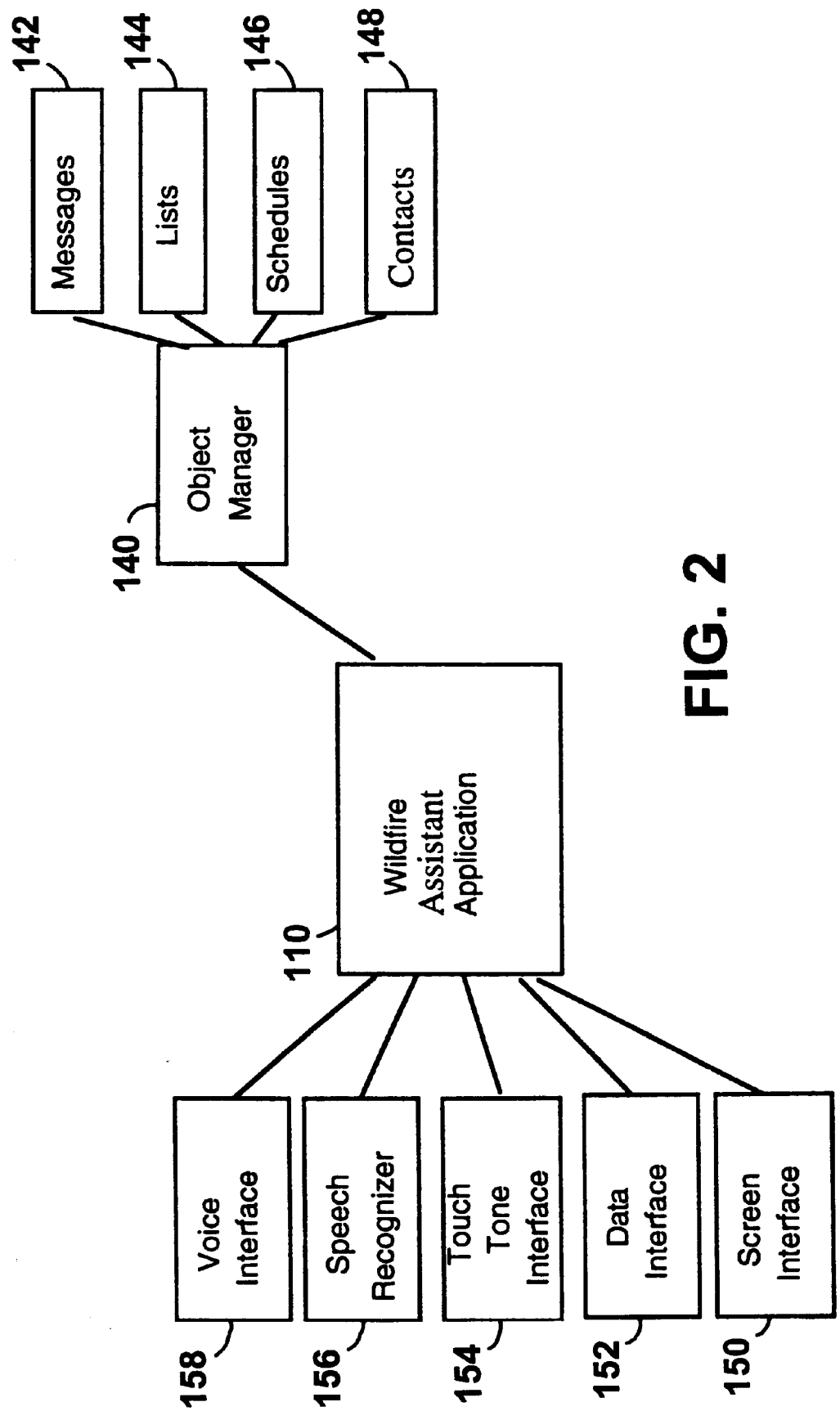
FIG. 2 is a block diagram of the software architecture of the system which embodies the invention.

Referring to FIG. 2, the software architecture lets users manage messages 142, lists 144, schedules 146, and contacts 148 through a variety of interfaces. Users can employ a screen interface 150 to access the computer's screen, or users can talk to the electronic assistant application through a voice interface 158 and a speech recognizer 156. Additionally, they can signal the assistant through a touch tone interface 158. Through voice/data modems (typically, but not limited to these modems) users can also cause data to be sent over a data interface 154.

Architecture

Figure 3:
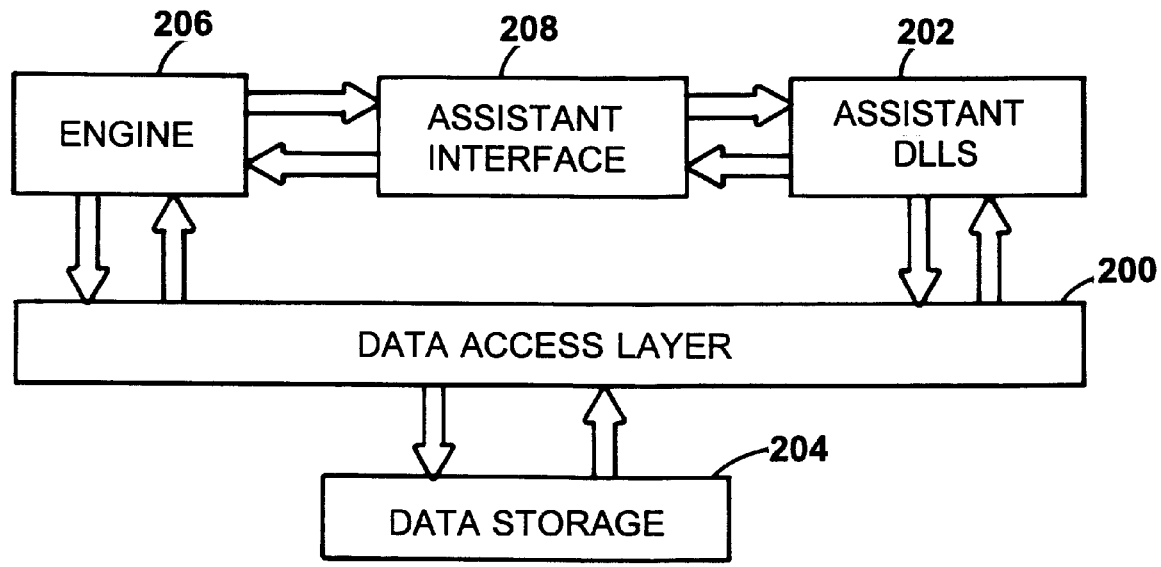
FIG. 3 is a block diagram showing the basic architecture of a system which embodies the invention.

The basic architecture for the personal assistant is shown in FIG. 3. The architecture includes a data access layer 200 which communicates with data storage 204 and with an engine 206 and one or more assistants 202. The assistants 202 and the engine 206 communicate with each other through an assistant interface 208. The data access layer 200 and the assistants 202 are implemented as DLLs. The data storage 204 for personal assistant is a file system. The main event loops of the entire system reside in the engine 206. Through the assistant interface 208, which is simply a defined API for use by the assistant DLLs, the engine 206 coordinates incalls, assistants, and interassistant communications.

In addition to the system shown in FIG. 3, there are two other pieces which are not shown. The first is a recognizer which is implemented as a recognition DLL that is used by the assistants to perform their tasks. The other piece is a desktop. There are also several GUI tools which integrate into the system.

Data Storage

The fundamental class in the data storage system is the Store Class. Every object which can possibly be stored in the database is derived from the Store class. It is derived from the Object class of the Microsoft Foundation Classes (MFC), which allows the use of Serialize routines to read and write data to disk. In addition to the Serialize routines, objects derived from the Store class also contain a Browse-Data method which allows for browsing of the data store. This routine returns lists of the data and pointers of the object, along with their values, in string form. The Store object is also where the object ID of every storable object resides. This is simply the pathname from the personal assistant root where the file that is used to store this object resides.

In order to store pointers to other objects, the store supports fat pointers. Each fat pointer, which itself is derived from the Store class, contains the object ID of the object it is "pointing" to. The Ptr class overloads the necessary operations to make programmers use of the store as invisible as possible.

In addition to providing storage functionality, this layer also provides a simple locking mechanism. This is a single lock, allowing one process access to the storage layer at a time.

The Engine

The Engine is where the main TAPI (TAPI is Microsoft's and Intel's Telephony API for Windows) and Windows event loops reside. As different assistants activate and deactivate, the engine sends those assistants the events necessary to do their work. Having the engine drive everything allows assistants to only write handlers for those events which are used by them. For example, if a game assistant is not programmed to handle an incall coming in on the phone line, the engine gets that message and passes it off to the main assistant which wakes up and handles the call appropriately.

The engine also has some functions which can be called by the assistants. These calls typically return status information (who's on, etc.), but also include calls to transfer control from one assistant to another. For example, if a user wants to play a game, the base assistant transfers control to the game (and gets it back later).

Assistants

The assistants are where the work really gets done. In this architecture, any "worker" is considered an assistant. The incaller interface, for example, is a separate DLL and therefore an assistant. This modularity allows different assistants to be quickly and easily plugged into the system on a per family/group or per person basis. There are several different types of assistants, and the assistant API contains a call allowing the setup routines to determine which assistants can perform which tasks. The described embodiment includes the following types of assistants:

| Incaller Assistant | answers the phone and either takes a message or hands off call to base assistant |
|---|---|
| Base Assistant | the assistant which implements the functionality that is the subject of this invention |
| Helper Assistant | anything else like games assistants, stock quote assistants, etc. |

Incaller Interface

The incaller interface is a separate assistant in the described embodiment. The incaller is only passed to a base assistant once it has been determined that they are a subscriber and they have given a correct password. There are three different incaller interfaces.

The first incaller interface simply replaces the home answering machine with the exception that names are gathered for screening purposes. A default greeting is played, and the incaller's name is collected, followed by a beep. All messages are deposited in a single common mailbox which is accessed through the GUI. There is a list of default greetings, in different voices, for the user to choose from, or the user can create her own greeting.

The second incaller interface makes use of individual mailboxes and is therefore only enabled once that level of setup has been performed. There are two major changes in this interface from the just-described, simpler version. First the name of the individual or group the caller is trying to reach is determined using speech recognition. Second, the name of the incaller is gathered and used to announce the call. Each message is placed in only the mailboxes of the intended targets.

Two types of incaller greetings are supported. The first one heard is the family message, similar to what most people have on their answering machines today (e.g. "Hi you've reached . . ."). This message is played to all incallers, and only one exists per system. The second type of greeting is per user. Only the incallers for a particular user receive this greeting, after designating who they are trying to reach.

There are two levels of presentation of greetings to the incaller. The system greeting is presented to all incallers immediately after the assistant answers the phone. Once a target user is identified (i.e., who the incaller is trying to reach), a message from that user to their incallers is played, if it exists.

The third interface is a hybrid of the first two. That is, some people use answering machines without giving out the names of the family members. In terms of the incaller interface, this interface plays the greeting of the simple interface, collects the incaller's name, and places the message in the mailboxes for all family members. Thus, it will give some family members messages that might not be relevant to them.

All of the incaller interfaces support screening of calls. This is done by playing the name that is collected from the incaller over speakers connected to the computer. The incaller is then immediately allowed to leave a message, which anybody in the home can interrupt by picking up any phone and pressing a particular touch-tone sequence.

The Base Assistant

The fundamental idea of the base assistant is to provide a user with an assistant which carries out the user's commands and helps the user perform tasks. In addition to this, the personal assistant supports a number of important functions, including a virtual intercom, a virtual refrigerator, and caller handoff, each of which is described briefly below.

Virtual Intercom

This intercom allows a user to call out to another user (i.e., a target user) at any point in time and the assistant then interacts with the user in the voice of the target user—giving the feeling of having a conversation with the target user.

The assistant's virtual intercom is a macro for a Send__A__Msg command (see below) which, instead of having the assistant respond with "Go__Ahead", has the target respond with a greeting, thereby also confirming the command recognition. In order to use the virtual intercom, a user first creates a macro or "quickie" command or <virtual intercom trigger> to call out to another user (e.g. "Hey Mom"). The response to the user giving the command comes back in the target's voice. After the message has been recorded, the assistant responds again using the voice of the target, e.g. saying something like "I'll get that the next time I call in." This gives the user a feeling of dealing directly with contacts, not just the assistant.

Virtual Refrigerator

There is also another feature the assistant referred to as the virtual refrigerator (a.k.a. the fridge). The fridge is where notes from members of the family can be left for all other members in the family to view. User's sending messages to everyone are given the option to have the message posted to the fridge. Messages posted in this manner behave differently from regular messages because they do not go away after somebody has heard them. In fact, they do not go away until the sender removes them from the fridge. In addition to being viewed, other family members can append postings to the original, allowing for things like grocery lists to be built up. In other words, anyone replying to a message on the virtual refrigerator is asked if the reply should be sent to everyone. If the reply is going out to everyone, the user is asked if they want it tacked on to the original to form a thread. A message remains on the fridge until the original sender removes the entire thread.

Threads are also supported with messages not on the fridge. While the assistant is holding any message, a user can say "Tell Me More" to receive more information about the message. The first level of information gives the date and time the message arrived as well as information about the previous message in the thread if this message is a reply. Another "Tell_Me_More" command would then play the previous message in the thread. In this manner, the "Tell_Me_More" command can be used to traverse the entire thread including all replies back to the original message. At some point, some of the messages may be deleted in which case the assistant will give the user that information.

Another important part of the assistant is the message list ordering. In general, the assistant has one pile of messages for a user to deal with, analogous to the stack of mail sitting in ones house somewhere. By default the messages are ordered as follows:

New Messages

New or Newly modified Refrigerator items

Old Items

Old Refrigerator items

The user can, however, modify this ordering.

An assistant, under an appropriate user command, looks through the pile, bringing items to a user's attention and allowing them to deal with them. In addition to this, a user can ask about an individual, using the Find command. In response, the assistant gathers any new, unheard messages from the identified person and move them to the current spot in the pile for immediate attention.

Incaller Handoff

Incaller handoff is a special feature which allows a user to handoff a call to the assistant in the middle of a conversation. There are several scenarios where this is a valuable feature. One is when a user calls home, talks to another family member, and now wants to get his or her messages. Another is when an incaller reaches a family member other than the one they would like to leave a message for. Optionally, the assistant notifies the family member by playing a simple instruction: "If the call wasn't for you, press <a specified key sequence> and hang up".

Also, at any point during a call, a person can press a special designated touch-tone to get the assistant's attention. In response to being called forward in this manner, it asks "Should I take a message, Yes or No?". This is phrased appropriately so that either the incaller or the person answering the phone can answer. If the user says yes, the assistant takes the caller through the incaller interface and allows them to leave a message. If the user says no, then the assistant goes into its usual opening sequence after recognizing the user. Thus, this works for everyone, including non-users like small children, babysitters and other visitors.

This allows the incaller to be a user of the assistant as well. For example, if Dad calls in and his five year old answers the phone, but Dad wants to be able to talk to the assistant, Dad simply says "Wildfire" and answers "no" to the question. This puts Dad into a conversation with the assistant, and the child can hang up anytime after Dad says "Wildfire".

Calendar

The calendar assistant is a simple way of automatically delivering messages to everyone on a given day. It's functionality allows a user to post an item to the calendar and set the day when the item becomes active. Each item contains a short text description and an audio clip. An active item is placed on the fridge on the given day and is removed from the fridge at midnight of the day the item is actually on.

Messaging

The GUI includes a messaging tool which allows users to play existing messages, view the fridge and the calendar, and compose new items for others.

The fridge display is graphical, showing postings on the fridge and also showing a user's graphical icon or magnet.

Touch Tone Model

The described embodiment uses a Bellcore VMUIF voice mail standard touch tone interface. It provides the capability to skip forward and backward during messages, as well as speedup and slowdown. These options are only available from touch-tone or from the GUI.

The touch tone model is based on accelerators, with commands which are not the most common being available through a two phase interface. The main interface is simple, i.e., press "0" to get a list of the available options. The "0" implements a touch tone version of Help. In response the assistant asks the user to hit the key of the option they want and then it gives up to 9 options. If there are more than 9 options, the user is asked to press "0" again for more options or * to cancel.

The 1 through 9 keys are used as accelerators.

There are two different sets of accelerators in the assistant, one set for use in the main menu, and one set for use during message playback.

Main Menu

| 1 = Send A Reply | 2 = Send A Copy | 3 = Send A Msg |
| 4 = First Msg | 5 = Tell Me More | 6 = Last Msg |
| 7 = Previous Msg | 8 = Throw It Away | 9 = Next Msg |
| * = Cancel | 0 = Help | # = Stop |

Message Playback:

| 1 = Rewind | 2 = Pause/Restart | 3 = Forward |
| 4 = Slower | 5 = Tell Me More | 6 = Faster |
| 7 = Previous Msg | 8 = Throw It Away | 9 = Next Msg |
| * = Cancel | 0 = Help | #= Stop |

There are also two special situations that also use touch tones, namely, logging in to the assistant and bringing the assistant into the foreground after a That_Will_Be_All_For_Now command.

The Commands

The following is a list of the commands that are supported by the assistant along with a functional description of each command.

First_Message Command

This command causes the assistant to move through the pile of messages so that it is holding the first message in the pile. It then announces to the user which message it is holding, and whether that message is unheard or not. Following that a prompt is given. The type of prompt that is given depends on what level of instruction the user is currently using. This level of instruction is selectable by the person who sets up the system initially.

If there are no messages left in the pile, the assistant informs the user that there are no messages, and that the assistant is not holding anything.

Next_Message Command

This command works exactly like the First_Message command except that the assistant moves to the next message in the list. If there are no messages, it responds in the same ways as it does for the First_Message command. If the current message is the last message in the list, the assistant moves around to the first message in the list and it announces that message as described above.

Previous_Message Command

This command works exactly like the Next_Message command with one minor exception. If the current message is the first one in the list, the assistant moves around to the last item and announce it appropriately.

Last_Message Command

This command works exactly like the First_Message command, except it causes the assistant to move to the last item in the list.

That_Will_Be_All_For_Now Command

This command causes the assistant to switch into a background mode and ignore anything said by the user except the command which brings it back into the foreground mode (i.e., the Wildfire command). The Wildfire command is the only way the user can bring the assistant back. However, the assistant can also come back into the foreground if something happens that must be communicated to the user, e.g. if the user receives a new message.

Wildfire Command

This command is used to perform a couple of tasks. It can be used to bring the assistant back into a conversation with a user, in which case it is used after a that_Will_Be_All_For_Now command. It can also be used to pass the phone between users. For example, if I were using the phone (perhaps a pay phone somewhere) and I was talking to the assistant, I could simply hand the phone to Sharon and she could say "Wildfire" which lets the assistant know that the phone has switched hands.

The response from the assistant in these situations is different. If the person saying the command "Wildfire" is the same user that the assistant was previously talking to, the assistant simply says "Here I Am". If the user is different, the assistant acknowledges them with "Hi SoAndSo, What can I do for you?".

Goodbye_Wildfire Command

This command is the equivalent to hanging up the phone. It also provides a clean closure to a conversation with one's assistant. In the first few days of use, the assistant in response to receiving this command might alert a user if he is quitting while he still has unheard new messages.

Help Command

This command always gives a user the available options at any given menu. It also uses the current status of the user's session to determine whether more help may be necessary. For example, if the user has asked for help more than once at the same position, the assistant will suggest that the user try some examples.

Send_A_Copy Command

This command tells the assistant to send a copy of the current message to another user or group. If there are no messages, the assistant informs the user. If there is a message, the user is asked for the name of the target, and the assistant records a "cover letter" and sends the message. After the operation is complete, the assistant resyncs the user by telling the user what the assistant is holding.

Send_A_Message Command

This command allows a user to send a message (i.e., the beginning of a new thread) to another user or group. The assistant prompts for the name of the target, records the message, and sends the message. The message that was just composed is then left in the list of items that the assistant is holding, and it is now the current message. It immediately follows what previously was the current message.

The sequence of exchanges which will typically occur when this command is invoked are as follows: "Send a message", <ToWhom>, "Target name", <GoAhead>, "message", <GotIt>. Note that the bracketed material, e.g. <GoAhead>, is the prompt or token that is played back by the assistant in response to input from the user.

Send_A_Reply Command

This command allows a user to respond to the current message. If the original message came from a group, the assistant asks if the reply should go to everyone. In either case, the reply is then recorded and sent. The reply is then left in the list of items that the assistant is holding and it is the current message. The previous item is the message that was replied to.

Tell_Me_More Command

This command allows a user to get more information about the current message. On every message, it gives the date and time when the message arrived. For messages that are replies to others, the first time the Tell_Me_More command is issued, the assistant also gives that information. For example: "This message arrived Yesterday at 5 PM. It is a reply to a message from Mom." Saying "Tell Me More" again in this instance plays the message from Mom. This cycle of the Tell_Me_More command giving the date and time info and playing the previous message in the thread can continue until the beginning of the thread is reached or a message which has been deleted is reached.

Throw_It_Away Command

This command causes the assistant to remove the current message from the pile (i.e., the list) and place it in the trash (i.e., delete it). If there are no messages, the user is so informed. If the message has not yet been heard, the user is asked to confirm the fact that the user wants to throw it away. Once the operation is complete, the user is informed of the current message being held by the assistant. Messages that have been thrown away can be retrieved via the GUI messaging tool, if necessary.

What's_It_Say Command

This command simply tells the assistant to play the current message. An appropriate prompt, for the user's current level of instruction, is also played after the message is complete.

What's_Happening Command

This command causes the assistant to ruffle through the pile of messages, grab those which are posted on the fridge, and move them to the current spot in the pile. The assistant then informs the user what was grabbed, by the number of messages and by the names of the senders. Regardless of whether any messages were found or not, the user is then informed as to what the assistant is currently holding.

Find Command

Issuing this command causes the assistant to ask for the name of a contact. If the contact is another user, the assistant gathers all unheard messages from that user and places them at the current position in the pile of messages. The assistant then informs the user of the number of messages and gives the user an instructional prompt, if appropriate. If the contact is the name of another assistant (e.g. a game assistant), the command activates that assistant.

<Virtual Intercom triggers>

These commands, which are programmable by the user, have the same behavior as the Send_A_Message command except the assistant does not need to ask "To Whom", and the "Go Ahead" is replaced with a greeting from the target. For example, the user may set the trigger to be "Hey, <target name>". When this command is issued, the assistant responds in the voice of the target.

Nevermind Command

This command is used to quit out of a submenu or to give up on a command. For example, a user could say Send_ A_Message and say Nevermind at the <ToWhom> prompt to give up on the command.

If_I_Get_A_Call Command

This command is issued by a user to provide their incallers with a greeting. If a greeting is already in place, the user is asked if it should be removed. Then, the user is allowed to record a new one, if the user desires to do so. After the completion of this command, the user moves out of the submenu and the assistant resyncs them by telling the user what it is currently holding and playing an instructional prompt, if appropriate.

Illustrative Dialog

The following is a sample dialogue which illustrates the virtual intercom, the virtual refrigerator, and the threaded message features. It shows the functionality of the assistant and provides examples of the use of the above-described commands.

The sample dialogue which is described is shown in its entirety in FIGS. 4a–4c. The convention used in FIG. 4 is as follows. All speech that is generated by the assistant (e.g. played tokens and responses) is highlighted in bold and all speech of the caller is shown in regular type. In the messages that are generated by the assistant and played to the caller, the portions which are played back in the voice of the identified person are bracketed in quotes. The prompts or reply tokens that are played back in the voice of the target are, of course, trained into the system during setup or at some earlier time. That is, the records the target saying the various prompts and tokens that will be used.

In this example, the caller, who we shall call Bill, is a user or a subscriber and thus is authorized to access the above-described functionality. The access authorization is achieved either through voice recognition of a special word, through a password, or through a combination of both.

When the subscriber calls into the system, the system plays a token announcing its presence to the caller and instructing the caller as to the available options. At this level, the system treats the caller as not a subscriber and presents the functionality that is available to nonsubscribers. If the caller is a nonsubscriber, the assistant functions as a very sophisticated answering machine. The system plays the following token (step 200):

Hello, I'm the assistant for Warner Associates.

Please say the name of the person you are trying to reach; "Bill Warner", "Jane", "Sally", "Pete", or anyone.

In the described embodiment, each of the persons names is presented using the voice of that particular person. These names are recorded at the time the system is setup and they are stored for later use.

To gain access to the subscriber functionality, i.e., to gain control of the assistant, the subscriber utters a special word, in this case, "Wildfire" (step 202). Using the previously described voice recognition capabilities, the system performs voice recognition on the word in an effort to recognize it and thereby verify that the caller is a subscriber. If the system confirms the identity of the subscriber, it acknowledges that by playing the following token (step 204):

Oh hi, "Bill". How is it going?

In this case, the system also seeks a password from Bill to verify his identity (step 206). The password is "Just Fine".

If the correct password is give, the assistant then plays another token which reports the status of all messages that are pending for the caller (step 208).

Okay, let's get started. You have new messages from "Joe", "pam": and "Gregg". Also, "Bob Smith from Allied Industries" called. You have one reminder and there are 2 new notes on the fridge.

After listing the messages that are available, the assistant goes to the first message among the list of new messages and says:

The first message is from "Joe".

To hear that message, the subscriber must use one of the available voice commands (step 210):

What's it say?

Again using voice recognition, the assistant recognizes the issued command and then performs the function requested by the command. In this case, the system plays back the previously recorded message that was left by Joe (step 212).

After the message from Joe is played back to the subscriber, the subscriber has several options regarding how to proceed. He can continue through the list of messages or he can access other functionality. In the illustrated example, the subscriber invokes the virtual intercom feature by speaking the name of another subscriber, optionally preceded by a special trigger word to further indicate that the subscriber wishes to invoke the virtual intercom (step 214):

Hey, Gregg.

Upon recognizing the command to invoke the virtual intercom and upon recognizing the identity of the other party for whom the message is intended, the assistant plays a prompt that was previously recorded in the voice of the other party, i.e., Gregg (step 216).

"What's up, Bill?"

It may be desirable to program the assistant to provide at this point a reply token that conveys useful information about the target. For example, if the target is already on another phone call that is being handled by the system (i.e., the system is aware of the target being on the other call), it could reply by saying (in the voice of the target) "I'm on the phone right now. Please leave me a message." Or if the target left the caller a message, the reply token might be (again in the voice of the target) "I left you a message."

In response, the subscriber generates the message that he wishes to leave for Gregg. Once the message is complete, as indicated by the pause occurring at the end of the message, the assistant confirms its receipt with the following ending token or prompt (step 218):

Got it. I'll see that he gets it.

The recorded message is then added to the list of messages for Gregg so that Gregg can later play back the message when he accesses the system.

Using the Next_Item command, the subscriber can move down through the list of messages that have been stored for him (step 220). The order in which the messages are played back is the order in which the were received, oldest message first. And the order in which the lists are played back is user selectable.

Another function which is supported by the assistant is the ability to store the history for any given message and play back that history upon receiving the appropriate command, i.e., the Tell_Me_More command. This functionality is illustrated in the next part of the example shown in FIGS. 4a–c.

After a message has been played, the subscriber can retrieve the next message by invoking the Next_Item command. That is, the subscriber says:

Next item.
The assistant responds by locating the next message, identifying who it is from:

Message from "Bob Smith of Allied Industries".

and then playing the recorded message.

The subscriber can navigate through the lists of messages by using the Next_Item and the Previous_Item commands. For example, by saying the Previous_Item command, the assistant moves back one message and identifies the source of that earlier message.

Message from Joe.

This time the contents of recorded message are not played back to the subscriber unless the appropriate command is used.

The command which enables the subscriber to access further details about the message, including its contents and its history is the Tell_Me_More command (step 222). As indicated, upon receiving that command, the assistant reports the time at which the message was received and it reports information about its history, if such information is available (step 224). In the illustrate example, the assistant reports:

This message arrived yesterday at 11 am. It's a reply to a message from you.

To access further information about the message, the subscriber again invokes the Tell_Me_More command (step 226). The second use of this command, causes the assistant to play back the contents of the message, preceded by an announcement identifying what is to follow (step 228):

Here is the original message. ". . . play the message . . ."

By repeatedly invoking the Tell_Me_More command, the user causes the assistant to move down through the messages in the chain or thread and report first on the type of message (e.g. it is a reply to the message from So-and-so) and then playing its contents. At some point the user will reach the last message of the thread at which point its reply will be (step 232):

That's all I know.

To generate a message that is attached to the fridge so that everybody in the family or group can access it, the user utters a preprogrammed trigger (step 240):

Hey, everyone.

In response, the assistant plays a prompt constructed from the recorded voices of all the members of the family or group (step 242):

Hello, hello, hello . . .

After playing the acknowledgment indicating that the functionality of the virtual refrigerator has been invoked, the assistant then records the message from the caller.

After the message is complete, as detected by a pause at the end of the user's message, the assistant plays another acknowledgment (i.e. "Got it") indicating that the message has been received. It then asks for confirmation that the user does indeed wish the message to be posted on the fridge (step 244).

By responding in the affirmative, the user causes the assistant to add the new message to the fridge where everybody that is part of the family/group can receive it or view it. The assistant acknowledges receipt of the user's affirmative answer by saying "Okay" (step 246).

If the user responds in the negative, the assistant asks the user to whom the message should be sent. In response, the use can identify any other member of the family/group and the assistant will append the message to the identified person's mailbox (i.e. message list).

When the user reaches the end of the list of new messages, the assistant indicates that the end has been reached and automatically moves to the next list, which in this case is the postings on the fridge (step 250). In this case, the first item on the fridge is a posting from Pam and it has two replies attached to it. The assistant reports the presence of a message from Pam and then it plays its contents. After the message has been played back to the user, the assistant goes through the list of replies that have been attached in the order in which they were attached and identifies the person who generated the reply and the contents of the reply. Optionally, the end of the list is identified by the personal assistant playing a special sound, e.g. a blip.

The user can add to the posting by using the Send_A_Reply command (step 252). The personal assistant responds with a prerecorded acknowledgment that indicates the message was understood (step 254) and then records the user's message until a pause of sufficient time indicates that the message has been completed (step 256). At the end of the receiving the message, the assistant again invites the user to confirm that the new message should be added to the posting on the fridge (step 258). If the user responds in the affirmative, the personal assistant adds it to the posting as another reply and then indicates that the operation was performed by saying "Okay" to the user (step 260).

Again, if the user decides not to append it to the posting, the personal assistant allows the user to place the message in some other user's mailbox.

By using the Next_Item command, the user can instruct the personal assistant to move down through the list of postings on the fridge, repeating the above-identified sequence for each item. Using an appropriate token, the assistant identifies the new postings, which are at the beginning of the list, and the old postings, which are toward the end of the list.

Message Storage Data Structure

Figure 5:
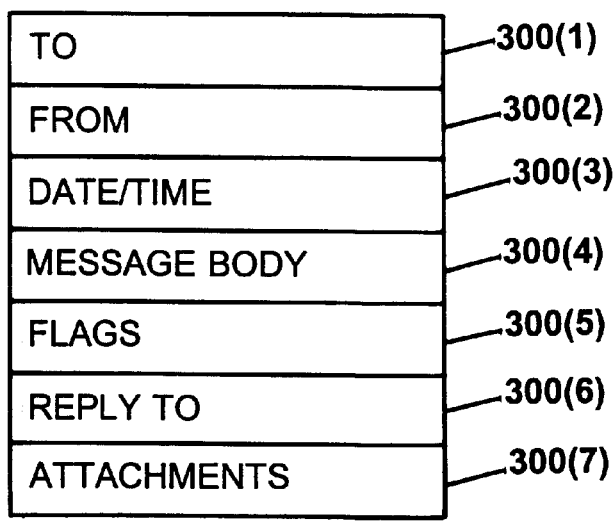
FIG. 5 shows a data structure that is used to store the messages.

The data structure for the storage of messages contains the information that is shown in FIG. 5. It has at least seven fields 300(1) through 300(7). Fields 300(1) and 300(2) are for identifying the party to whom the message was sent and the party who created the message, respectively. Field 300(3) is for storing the time at which the message was generated. Field 300(4) stores the location of the actual contents of the message, which is stored as a .WAV file—a standard Windows sound file format. Field 300(5) holds a set of flags, including a flag for indicating whether the message is a new message (i.e., not yet been read), a flag for indicating whether the message is an old message (i.e., it has been read) and a flag for indicating whether the message should be deleted. Field 300(6) is for storing a Reply_To pointer to the data structure for which this message is a reply, assuming it is a reply. And field 300(7) is for storing a pointer to any attachments such as embedded messages or refrigerator attachments.

Note that the reply field 300(6) is used to link newer messages back to the older messages for which they represent a reply. Thus, each message in a thread has a link to the message to which it was a reply. The list of all of the members of a complete thread can be determined by simply traversing the Reply_To pointers that are stored in this linked list of data structures. In other words, threads are not maintained for individual users. Rather, the Reply_To field provides the information regarding what messages are in the thread. The assistant does not allow one user to get to another user's messages, thus, that user also cannot get to the thread of the other user.

When traversing a thread, a simple pointer is kept on the current message. This pointer keeps track of which data structure the user is on as well as providing direct access to audio file for that message.

The attachments field 300(7) of the data structure is used to store Attachments pointers from an original refrigerator posting to its appendages. The attachment field of the original message on the refrigerator would point to the first attached message and so on for each added message, thus forming a linked list of messages.

A user object has a list of messages for a particular user. A shared message results in a data structure in each user's list, but all of those data structures point to the same audio file, and the To field points to all of the recipients (i.e., a group message would show all users in the To field).

Other embodiments are within the following claims.

What is claimed is:

1. A message handling method implemented by a computer-based electronic assistant, said method comprising:

storing a voice message that includes a recorded message and stored information describing said voice message, and wherein said voice message is a reply to a first message;

receiving a command of a first command type from a caller;

in response to receiving said command of said first command type, playing said recorded message to said caller;

after playing said recorded contents, receiving a command of a second command type from said caller;

in response to receiving the command of said second command type, reporting to said caller said stored information describing said voice message; and after reporting said stored information, receiving a further command of said second type; and in response to receiving the further command of said second command type, playing said first message to which the voice message was a reply.

2. A call handling method implemented by a computer-based electronic assistant, said method comprising:

using the computer-based electronic assistant to monitor a telephone call between a first person and a second person;

in response to a first command issued by either the first or second person, causing the electronic assistant to intervene and participate in the telephone call; and in response to a further command issued by either the first or second person, causing the electronic assistant to provide voice mail services to the party issuing the further command, thereby permitting the other party to terminate its participation in the telephone call.

* * * * *